United States Patent [19]

Sundararaman et al.

[11] Patent Number: 5,142,019
[45] Date of Patent: Aug. 25, 1992

[54] OLIGOMERS FORMED FROM REACTION OF ACRYLAMIDOGLYCOLATE ALKYL ETHERS WITH BETA-HYDROXYALKYLAMINES

[75] Inventors: Padmanabhan Sundararaman, Allison Park; Rudolf Maska; Cynthia L. Verardi, both of Pittsburgh, all of Pa.

[73] Assignee: PPG Industries, Inc., Pittsburgh, Pa.

[21] Appl. No.: 770,397

[22] Filed: Oct. 3, 1991

[51] Int. Cl.$^5$ .............................................. C08G 69/02
[52] U.S. Cl. ........................................ 528/271; 528/332;
528/367; 528/392; 528/422; 525/328.2;
560/169; 560/170; 560/174; 560/183; 560/185;
526/304
[58] Field of Search .......... 528/271, 332, 367, 392,
528/422; 525/328.2; 560/169, 170, 174, 183,
185; 526/304

[56] References Cited

U.S. PATENT DOCUMENTS

| 4,076,917 | 2/1978 | Swift et al. | 526/49 |
|---|---|---|---|
| 4,101,606 | 7/1978 | Cenci et al. | 525/218 |
| 4,115,637 | 9/1978 | Cenci et al. | 526/56 |
| 4,138,541 | 2/1979 | Cenci et al. | 526/383 |
| 4,443,623 | 4/1984 | Photis | 560/170 |
| 4,446,280 | 5/1984 | Cady et al. | 525/186 |
| 4,454,301 | 6/1984 | Cady et al. | 525/118 |
| 4,528,320 | 7/1985 | Ley et al. | 524/555 |
| 4,530,960 | 7/1985 | Ley et al. | 524/555 |
| 4,656,308 | 4/1987 | Schirmann et al. | 560/170 |
| 4,722,965 | 2/1988 | Wong et al. | 524/812 |
| 4,755,623 | 7/1988 | Dileone | 564/160 |
| 4,778,728 | 10/1988 | Lucas | 428/461 |
| 4,808,660 | 2/1989 | Schmeing et al. | 524/812 |
| 4,844,970 | 7/1989 | Goldstein et al. | 428/198 |
| 4,988,597 | 1/1991 | Spiewak et al. | 430/62 |

*Primary Examiner*—Samuel A. Acquah
*Attorney, Agent, or Firm*—William J. Uhl

[57] ABSTRACT

An oligomer of the structure:

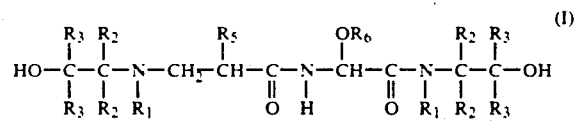

wherein $R_1$ is hydrogen, lower alkyl having 1 to 5 carbon atoms or hydroxyalkyl having 1 to 5 carbon atoms; $R_2$ and $R_3$ are the same or different radicals selected from hydrogen, alkyl having 1 to 5 carbon atoms or one of $R_2$ and one of $R_3$ radicals joined together with the carbon atom to which they are attached to form cycloalkyl; $R_5$ is hydrogen or methyl; $R_6$ is alkyl having 1 to 6 carbon atoms, cycloalkyl of 5 to 6 carbon atoms and hydroxyalkyl of 2 to 6 carbon atoms. The oligomers can be used as reactive components with other materials containing co-reactive functional groups selected from hydroxyl, carboxylic acid, carboxylic acid anhydride and isocyanate. Reactive compositions can be formed which are useful as resinous film formers in coating applications which can be cured without the generation of formaldehyde.

6 Claims, No Drawings

1

OLIGOMERS FORMED FROM REACTION OF ACRYLAMIDOGLYCOLATE ALKYL ETHERS WITH BETA-HYDROXYALKYLAMINES

CROSS REFERENCE TO RELATED APPLICATION

Reference is made to application Ser. No. 07/770,491, filed even date herewith, which discloses polymers containing pendant groups having certain active ether and hydroxyalkylamide groups.

BACKGROUND OF THE INVENTION

Field of the Invention: The present invention relates oligomers which contain functional groups enabling them to be reactive with other materials containing co-reactable functional groups.

Brief Description of the Prior Art: Alkyl acrylamidoglycolate alkyl ethers and their use in making vinyl addition polymers and curable compositions containing such addition polymers are known in the art. See, for example, U.S. Pat. Nos. 4,528,320; 4,530,960, 4,656,308 and 4,755,623. Such compositions are curable with amine. Also, these polymers are self-curable or are curable by reaction with materials containing hydroxyl or carboxyl functionalities. Such materials, when they cure, do not generate free formaldehyde.

Curable compositions containing beta-hydroxyalkylamide groups which are curable with polycarboxylic acids and polycarboxylic acid anhydrides are also known in the prior art. See, for example, U.S. Pat. Nos. 4,076,917; 4,101,606; 4,115,637 and 4,138,541. These compositions are curable without the generation of free formaldehyde.

SUMMARY OF THE INVENTION

In accordance with the present invention, an oligomer of the structure:

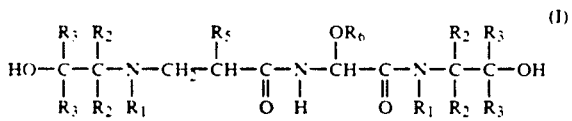

wherein $R_1$ is hydrogen, lower alkyl having 1 to 5 carbon atoms or hydroxyalkyl having 1 to 5 carbon atoms; $R_2$ and $R_3$ are the same or different radicals selected from hydrogen, alkyl having 1 to 5 carbon atoms or one of the $R_2$ and one of the $R_3$ radicals joined together with the carbon atom to which they are attached to form cycloalkyl; $R_5$ is hydrogen or methyl; $R_6$ is alkyl having 1 to 6 carbon atoms, cycloalkyl of 5 to 6 carbon atoms and hydroxyalkyl of 2 to 6 carbon atoms. The oligomer can be used as a reactive component with other materials containing co-reactive functional groups selected from hydroxyl, carboxylic acid, carboxylic acid anhydride and polyisocyanate.

DETAILED DESCRIPTION

The oligomers depicted by (I) above han be prepared by reacting alkyl acrylamidoglycolate alkyl ethers having the general structural formula:

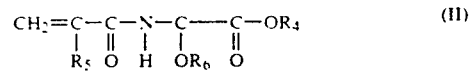

where $R_5$ and $R_6$ are as described in connection with (I) above and $R_4$ is selected from alkyl containing 1 to 6 carbon atoms, cycloalkyl of 5 to 6 carbon atoms and hydroxyalkyl of 2 to 6 carbon atoms, with an alkanolamine having the following structure:

wherein $R_1$, $R_2$ and $R_3$ are as described in connection with (I) above.

The oligomer (I) can be prepared by simply mixing (II) and (III) together in about a 1:2 molar ratio and heating to initiate an exotherm. The reaction is permitted to proceed with slight cooling to control the exotherm and maintained at about 60°-80° C. for about ½ to 2 hours to form the desired reaction.

Examples of the alkyl acrylamidoglycolate alkyl ether depicted in (II) above are methyl acrylamidoglycolate methyl ether (MAGME), ethyl acrylamidoglycolate ethyl ether, butyl acrylamidoglycolate butyl ether, methyl acrylamidoglycolate ethyl ether and ethyl acrylamidoglycolate methyl ether, with MAGME being preferred. Mixtures of such monomers can also be used.

Examples of the beta-hydroxyalkylamines depicted by (III) above include 2-aminoethanol; 2-methylaminoethanol; 2-ethylaminoethanol; 2-N-propylaminoethanol; 2,2'-iminodiethanol; 2-aminopropanol; 2,2'-iminodiisopropanol; 2-aminocyclohexanol; 2-aminocyclopentanol; 2-aminoethyl-2-methylethanol; 2-N-butylaminoethanol; 2-methylamino-1,2-dimethylethanol; 2-amino-methyl-1-propanol; 2-amino-2-methyl-1,3-propanediol; 2-amino-2-ethyl-1,3-propanediol and 2-amino-2-hydroxymethyl-1,3-propanediol.

The oligomers of the present invention can be combined with materials containing co-reactive functional groups to form reactive compositions. Examples of such materials containing co-reactive functional groups include polyols, polycarboxylic acids, polycarboxylic acid anhydrides and polyisocyanates. These materials can be monomers, oligomers or polymers and can have molecular weights as low as 62 to as high as 100,000 with the molecular weights of the polymers being on a weight average basis determined by gas chromatography using a polystyrene standard.

The polyols can have hydroxyl values between about 1500 and 10, preferably between 500 and 50. The polyols include low molecular weight diols and triols and higher alcohols and higher molecular weight polymeric polyols which are preferred, such as polyester polyols and hydroxyl group-containing acrylic polymers. The low molecular weight diols, triols and higher alcohols can have hydroxyl values of 200 and above, usually within the range of 1500 to 200. Such materials include aliphatic polyols, particularly alkylene polyols containing from 2 to 18 carbon atoms. Examples include ethylene glycol and 1,4-butanediol, trimethylolpropane and pentaerythritol and cycloaliphatic polyols such as 1,2-cyclohexanediol and cyclohexanedimethanol.

Polyester polyols which can be used as a polyol component can be prepared by the polyesterification of organic polycarboxylic acid or anhydride thereof with organic polyols in which the OH/COOH ratio is generally greater than one. Usually the polycarboxylic acids and polyols are aliphatic or aromatic basic acids and diols.

The diols which are usually employed in making the polyester include alkylene glycols, such as ethylene glycol and neopentyl glycol. Polyols of higher functionality can also be used. Examples include trimethylolpropane and pentaerythritol.

The acid component of the polyester consists primarily of monomeric carboxylic acids or anhydrides having 2 to 18 carbon atoms per molecule. Among the acids which are useful are phthalic acid, terephthalic acid, adipic acid, azelaic acid and dodecanoic acid. Also, there may be employed higher polycarboxylic acids such as trimellitic acid. Where acids are referred to above, it is understood that anhydrides of those acids which form anhydrides can be used in place of the acid. Also, lower alkyl esters of the acids such as dimethyl terephthalate can be used.

In addition to the polyester polyols, hydroxy-containing acrylic polymers or acrylic polyols can be used as the polyol component.

Among the acrylic polymers are interpolymers of about 5 to 95 percent by weight hydroxy-containing vinyl monomers such as hydroxyalkyl acrylate and methacrylate having 2 to 6 carbon atoms in the alkyl group and 95 to 5 percent by weight of other ethylenically unsaturated copolymerizable materials such as alkyl acrylates and methacrylates; the percentages by weight being based on the total weight of the monomers used in preparing the acrylic polymer.

Examples of suitable hydroxyalkyl acrylates and methacrylates are acrylic acid and methacrylic acid esters of ethylene glycol and propylene glycol.

Examples of suitable alkyl acrylates and methacrylates are lauryl methacrylate, 2-ethylhexyl methacrylate and n-butyl acrylate.

Besides the acrylates and methacrylates, other copolymerizable monomers which can be copolymerized with the hydroxyalkyl acrylates and methacrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alpha-methyl styrene, alpha-methyl chlorostyrene, vinyl butyrate, vinyl acetate, allyl chloride and mixtures thereof.

The acrylic polymers can be prepared by conventional vinyl polymerization techniques.

Examples of materials containing co-reactive carboxylic acid and/or anhydride groups would include cycloaliphatic polycarboxylic acids and aromatic polycarboxylic acids. Representative examples would be adipic acid, sebacic acid, azelaic acid, succinic acid, phthalic acid, tetrahydrophthalic acid, hexahydrophthalic acid, maleic acid, fumaric acid, citraconic acid and itaconic acid. Also, anhydrides of such acids where they exist can be used. In addition to monomeric polycarboxylic acids and anhydrides, as mentioned above, oligomeric and polymeric polycarboxylic acids or anhydrides can also be used. Examples would include carboxylic acid group-containing polyester oligomers and polymers and carboxylic acid group and anhydride group-containing acrylic polymers. The carboxylic acid group-containing polyester oligomers and polymers can be formed from reacting an organic monomeric polyol or polymeric polyol with a 1,2-dicarboxylic acid anhydride under conditions sufficient to ring open the anhydride forming the half-ester with substantially no polyesterification occurring. Examples of suitable monomeric polyols are alkylene polyols such as ethylene glycol, neopentyl glycol and trimethylolpropane. Examples of suitable polymeric polyols are the polyester polyols described above. Examples of suitable 1,2-dicarboxylic acid anhydrides include aliphatic and aromatic anhydrides such as succinic anhydride and phthalic anhydride.

The carboxylic acid and carboxylic acid anhydride group-containing acrylic polymer can be prepared by polymerizing 5 to 95 percent by weight of an acid and/or an anhydride group-containing acrylic monomer such as acrylic acid, methacrylic acid, maleic anhydride or itaconic anhydride with other copolymerizable ethylenically unsaturated monomers such as the non-functional monomers mentioned above in connection with the preparation of the hydroxyl group-containing acrylic polymer; the percentage by weight being based on total weight of vinyl monomers used in preparing the carboxylic acid and/or anhydride group-containing acrylic polymer.

Examples of suitable polyisocyanates include aliphatic or aromatic polyisocyanates or mixtures thereof. Examples of suitable aromatic polyisocyanates are 4,4'-diphenylmethane diisocyanate, toluene diisocyanate and polymethylene polyphenyl isocyanate. Examples of suitable aliphatic polyisocyanates are 1,4-tetramethylene diisocyanate and 1,6-hexamethylene diisocyanate. Also, isocyanate dimers and trimers can be used such as the biuret or isocyanurate of 1,6-hexamethylene diisocyanate. Cycloaliphatic polyisocyanates can be used such as 4,4'-methylenebis(cyclohexyl isocyanate). Isocyanate prepolymers such as are obtained by reacting active hydrogen-containing compounds with a stoichiometric excess of an organic polyisocyanate such as those described above can also be used. Examples of such active hydrogen-containing materials are polyhydroxyl group-containing materials or polyols having two or more hydroxyl groups per molecule such as those described above. The isocyanate can optionally be blocked with a material such as an alcohol, ketoxime, caprolactam or other blocking agent well known in the art in which the blocked isocyanate is stable at room temperature enabling the formation of single component compositions but which unblock and become reactive at elevated temperatures.

The amount of the material containing the co-reactive hydroxyl, polycarboxylic acid, polycarboxylic acid anhydride or polyisocyanate which is used will be dependent on whether the material is a monomer, oligomer or polymer and whether it is desired to form a curable composition or merely to use the oligomers of the present invention to chain extend and build molecular weight of the material containing the cofunctional reactive group resulting in a higher molecular weight but essentially uncured reaction product. In general, for hydroxyl functional materials, the equivalent ratio of hydroxyl to the

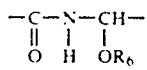

group in the oligomer is within the range of 0.1 to 2:1. For carboxylic acid, carboxylic acid anhydride, the equivalent ratio of carboxylic acid or anhydride to hydroxyl groups in the oligomer is from 0.1 to 2:1. In the above calculations, anhydride is considered to be difunctional. For polyisocyanates, the equivalent ratio of isocyanate to hydroxyl in the oligomer is from 0.1 to 1:1, and the final reacted product is substantially free of unreacted isocyanate functionality.

The oligomers (I) of the present invention in combination with the materials containing the co-reactive functional groups are useful as resinous binders in coating compositions. They are used with organic solvent to form organic solvent-borne compositions. Solvents which may be employed include aromatic solvents such as toluene, xylene and the like; aliphatic solvents such as heptane, octane and the like. Also, polar solvents such as dimethylformamide, dimethylsulfoxide and hydrogenated solvents such as ethers, esters and alcohols may be used. Aqueous compositions can be prepared when the material containing the co-reactive functional groups contains acid or anhydride functionality. Salts of these carboxyl group-containing materials can be formed which can be used to co-disperse the oligomer of the present invention in water. Also, the carboxyl group-containing material can be prepared in latex form and combined with oligomer which is water miscible. Typically, the functional groups would be present in the coating composition in amounts of about 5 to 95, more typically 30 to 80 percent by weight based on total weight of the composition.

The coating compositions may contain other ingredients such as catalyst, pigments, flow additives, surfactants and other resinous materials.

The coating compositions of the present invention can be used as general purpose industrial coatings and varnishes, machinery and equipment coatings, especially metal coatings such as for containers, appliances, automobiles and the like. In addition, the reactive compositions can be used for forming films, paints, lacquers, varnishes, caulks, impregnants and adhesives for both natural and synthetic materials such as paper, textiles, wood, plastics, metal, leather and in areas where compositions based on formaldehyde generating curing agents are presently employed. When the compositions of the invention are applied as coatings, they are typically cured over the temperature range of 250° to 400° F. (121° to 204° C.) for 30 seconds to 60 minutes. The compositions can be applied by any conventional coating means such as brushing, spraying, dipping or roll coating.

WORKING EXAMPLES

The following examples show the preparation of compositions based on oligomers of the present invention in combination with other materials containing co-reactive functional groups and the formulation of the compositions into reactive compositions and the application of the compositions to metal substrates to form coatings.

In the examples, all parts and percentages are by weight unless otherwise specified. It should be appreciated that the examples are illustrative only and it will be apparent to those skilled in the art that other oligomers and other materials containing co-reactive functional groups may be employed in an analogous manner to form reactive compositions and coating compositions based thereon.

EXAMPLE I

The following example shows the preparation of an oligomer prepared by reacting acrylamidoglycolate methyl ether with diethanolamine and the combination of this oligomer with a carboxylic acid group-containing acrylic polymer and the evaluation of the combination as a coating for cure response and ink wetting.

To a three-liter round bottom flask equipped with an electric heater, condenser, thermometer, stirrer and graduated addition cylinder was charged at room temperature 605.5 grams of methyl acrylamidoglycolate methyl ether (3.5 moles) and 735 grams of diethanolamine (7.0 moles). The contents were heated to 60° C. over 20 minutes. At 60° C. an exotherm started raising the temperature to 72° C. without further heating. The reaction mixture was then cooled to 70° C. and held there for one hour followed by cooling to room temperature to form a reaction product containing an oligomer of the structure:

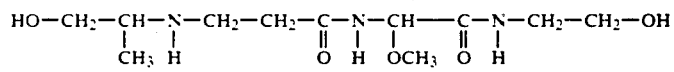

The oligomeric reaction product was co-dispersed with a neutralized carboxylic acid group-containing acrylic polymer described below in water to form a 40 percent by weight resin solids dispersion. The equivalent ratio of oligomer (hydroxyl groups) to polymer (carboxylic acid groups) was 1:1. The dispersion was drawn down over an aluminum substrate (can stock) to about a 0.1 mil thickness and cured for 90 seconds at 400° F. The resultant coating was clear and colorless with some solvent popping. The cured film had a 5H pencil hardness and withstood 55 methyl ethyl ketone double rubs.

The pencil hardness was determined by taking pencils of increasing hardness and attempting to etch the coating. The softest pencil which would etch the coating was reported. The methyl ethyl ketone double rubs involved rubbing a coated substrate with a methyl ethyl ketone saturated cloth in a back and forth motion (double rub) with firm hand pressure. The number of double rubs required to remove the coating from the substrate was reported.

The acrylic polymer used in this example was prepared by solution polymerization techniques in the presence of wax according to the procedures described in U.S. Pat. No. 5,034,454 and specifically was prepared from 20 percent by weight acrylic acid, 75 percent by weight methyl methacrylate and 5 percent by weight styrene, the percentages by weight being based on total weight of monomers. The polymer was neutralized with dimethylethanolamine, 100 percent total theoretical neutralization and dispersed in aqueous medium comprising 84 percent by weight water, 11 percent by weight 2-butoxyethanol, 4.5 percent by weight dimethylethanolamine and 0.5 percent by weight n-butanol, the percentages by weight being based on total weight of aqueous medium. The solids content of the dispersion was 40 percent by weight.

EXAMPLE II

This example shows the formulation of a varnish with the oligomer of Example I and a carboxylic acid group-containing acrylic polymer and the application of the varnish to aluminum can stock to which was previously applied an uncured ink layer.

The varnish was formulated with 12.09 grams (11.12 grams solids) of the oligomer of Example I, 125 grams (50 grams solids) of the acrylic polymer described below and 2.44 grams (0.61 grams solids) of a silicon surfactant available as SILWET L7605 available from Union Carbide Corporation, diluted to 25 percent solids content with 2-hexoxyethanol. The varnish was drawn down over the uncured ink layer (wet on wet application). The varnish and ink were then simultaneously cured first for 90 seconds at 400° F. (204° C.) followed by 3 minutes at 400° F. (204° C.). The resultant coating had a pencil hardness of 5H, exhibited good flow and good ink wetting and was slightly yellowed. When the example was repeated but without the silicon surfactant, the resultant coating had very poor ink wetting, i.e., the coating agglomerated on the ink layer exposing large unvarnished areas, and the film was yellowed.

The carboxylic acid group-containing acrylic polymer used in this example was prepared by solution polymerization techniques in the presence of wax according to the procedure described in U.S. Pat. No. 5,034,454 and specifically was prepared from 74.7 percent methyl methacrylate, 20 percent acrylic acid, 5.1 percent styrene and 0.2 percent glycidyl methacrylate; the percentages by weight being based on total weight of monomers. The polymer was neutralized with dimethylethanolamine, 100 percent total theoretical neutralization, and dispersed in water, solids content 40 percent by weight.

We claim:

1. An oligomer of the structure:

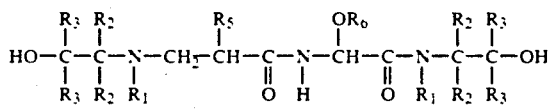

wherein $R_1$ is hydrogen, lower alkyl having 1 to 5 carbon atoms or hydroxyalkyl having 1 to 5 carbon atoms; $R_2$ and $R_3$ are the same or different radicals selected from hydrogen, alkyl having 1 to 5 carbon atoms or one of $R_2$ and one of $R_3$ radicals joined together with the carbon atom to which they are attached to form cycloalkyl; $R_5$ is hydrogen or methyl; $R_6$ is alkyl having 1 to 6 carbon atoms, cycloalkyl of 5 to 6 carbon atoms and hydroxyalkyl of 2 to 6 carbon atoms.

2. The oligomer of claim 1 in which $R_2$ is hydrogen and $R_3$ is selected from hydrogen and alkyl having 1 to 5 carbon atoms.

3. The oligomer of claim 1 in which $R_1$ is hydroxyalkyl having 1 to 5 carbon atoms.

4. The oligomer of claim 1 in which $R_1$ is hydroxyethyl and $R_2$ and $R_3$ are hydrogen.

5. The oligomer of claim 1 in which $R_5$ is hydrogen.

6. The oligomer of claim 1 in which $R_6$ is methyl.

* * * * *